(12) United States Patent
Gulliver et al.

(10) Patent No.: US 9,390,120 B1
(45) Date of Patent: Jul. 12, 2016

(54) SYSTEM AND METHODS FOR ORGANIZING HIERARCHICAL DATABASE REPLICATION

(71) Applicant: Google Inc., Mountain View, CA (US)

(72) Inventors: Ian Ashleigh Gulliver, Santa Clara, CA (US); Mikey Dickerson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 14/145,444

(22) Filed: Dec. 31, 2013

(51) Int. Cl.
*G06F 17/30* (2006.01)

(52) U.S. Cl.
CPC .............................. *G06F 17/30371* (2013.01)

(58) Field of Classification Search
CPC .......... G06F 17/30578; G06F 11/1458; G06F 17/30581
See application file for complete search history.

(56) References Cited

U.S. PATENT DOCUMENTS

| | | | |
|---|---|---|---|
| 6,226,650 B1 | 5/2001 | Mahajan et al. | |
| 6,243,715 B1 | 6/2001 | Bogantz et al. | |
| 6,892,210 B1 | 5/2005 | Erickson et al. | |
| 7,568,034 B1* | 7/2009 | Dulitz et al. | 709/226 |
| 7,716,660 B2 | 5/2010 | Mackay | |
| 7,966,285 B2 | 6/2011 | Sawadsky et al. | |
| 8,103,728 B2 | 1/2012 | Johnson | |
| 8,655,838 B2 | 2/2014 | Wright | |
| 2006/0101081 A1* | 5/2006 | Lin et al. | 707/200 |
| 2007/0061375 A1* | 3/2007 | Brown et al. | 707/200 |
| 2007/0297458 A1 | 12/2007 | Narayanan et al. | |
| 2008/0130639 A1 | 6/2008 | Costa-Requena et al. | |
| 2012/0005154 A1* | 1/2012 | George et al. | 707/607 |
| 2012/0084429 A1 | 4/2012 | Steiner et al. | |
| 2012/0166390 A1* | 6/2012 | Merriman et al. | 707/613 |
| 2012/0226933 A1* | 9/2012 | Baptist | G06F 11/0727 714/6.2 |
| 2014/0279905 A1* | 9/2014 | Muniswamy-Reddy et al. | 707/639 |

FOREIGN PATENT DOCUMENTS

CA    1252903    4/1989

* cited by examiner

*Primary Examiner* — Yuk Ting Choi
(74) *Attorney, Agent, or Firm* — Fish & Richardson P.C.

(57) ABSTRACT

Systems and methods for receiving a database update and organizing hierarchical databases are provided. A database server may receive a database update requested from another server. The database server may determine a transaction metric based on the received database update. The database server may select another database server to request database updates from based on comparing the transaction metric with a predetermined transaction threshold.

20 Claims, 6 Drawing Sheets

SYSTEM AND METHODS FOR ORGANIZING HIERARCHICAL DATABASE REPLICATION

FIELD OF THE INVENTION

In general, the invention relates to systems and methods for organizing hierarchical databases.

BACKGROUND

The increased demand in internet services has necessitated the need for replicated database servers, which help distribute database transactions across multiple database servers. The replicated database servers offload database transactions from master database servers. However, when the number of the replicated database servers increases, keeping them up to date becomes an issue.

Traditionally, database hierarchies are built using a flat replication tree, where all the replicated slave database servers connect directly to a master database server. The master database server sends database updates to each of the connected redundant slave database servers, to keep the redundant slave databases consistent with the master database. However, this puts extra load on the master database server and can saturate the master database's total network bandwidth, causing long delays in receiving database updates from the master database server at the replicated slave database servers.

Alternatively, database servers can be arranged such that replicated slave database servers receive updates from other replicated slave database servers which have received updates from the master database server. This can help reduce the load on the master database server. However, this is currently done through a manual and static configuration process, which can fail during network failures, machine failures, and unexpected network changes.

Therefore, systems and methods for organizing hierarchical database replication, which can solve these problems, are needed.

SUMMARY

Accordingly, systems and methods disclosed herein provide techniques for organizing hierarchical databases. Certain implementations relate to methods for receiving a database update. A database server may include control circuitry configured to control the operation of the database server. Processes and operations performed by the database server may be implemented using the control circuitry. The database server may receive a database update request from another database server. A randomized transaction metric may be determined based on the received database update. The database server may select another database server to request database updates from based on comparing the randomized transaction metric with a predetermined transaction threshold.

Certain implementations relate to a database system. The system may include a plurality of database servers, which communicate through a network. One of the database servers may be configured to receive a database update requested from another database server, determine a randomized transaction metric based on the received database update, and select another database to request database updates from based on comparing the randomized transaction metric with a predetermined transaction threshold.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for organizing hierarchical databases. However, it will be understood by one of ordinary skill in the art that the systems and methods described herein may be adapted and modified as is appropriate for the application being addressed and that the systems and methods described herein may be employed in other suitable applications, including data center systems and cloud computing systems, and that such other additions and modifications will not depart from the scope thereof.

Figure 1:
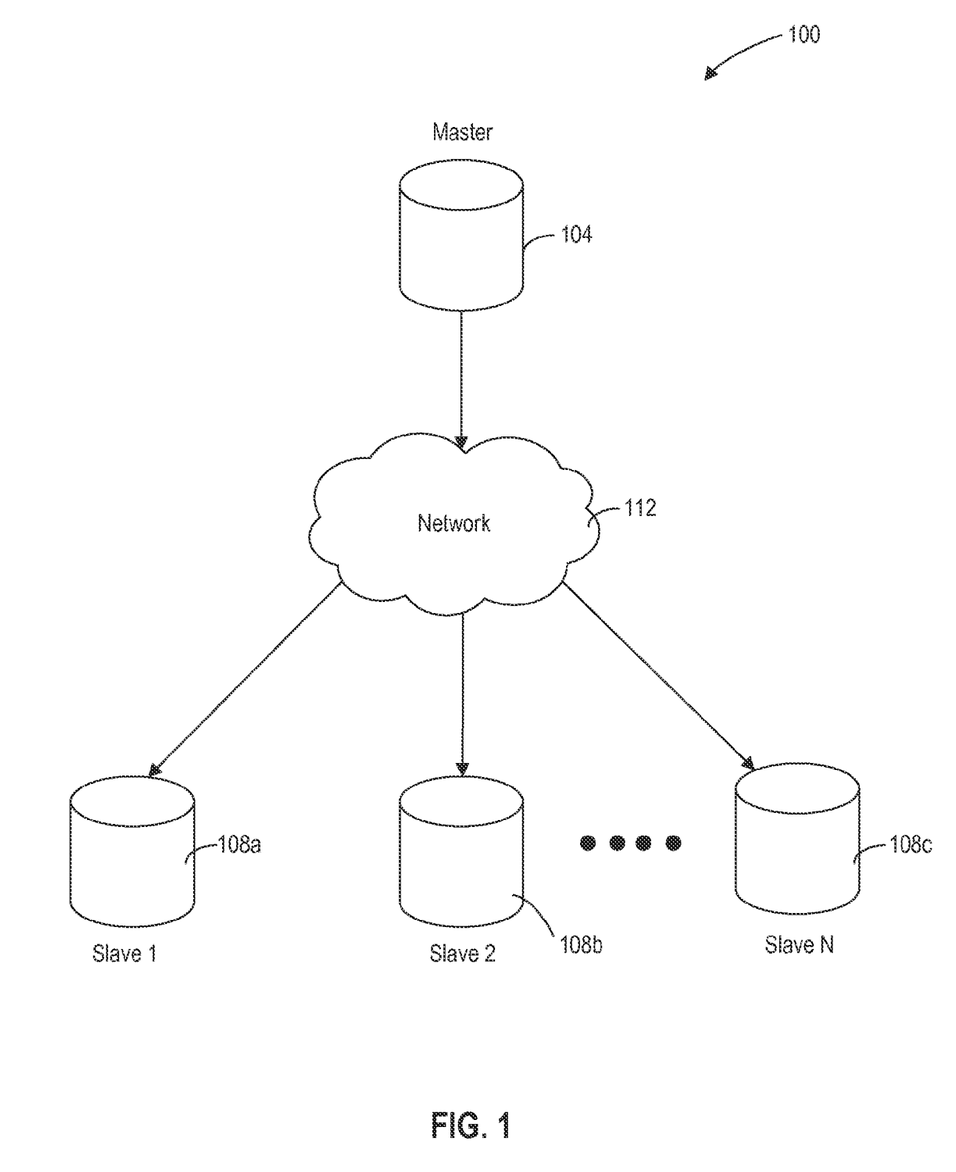
FIG. 1 is a simplified representation of a database hierarchy where multiple slave databases are connected to a master database in accordance with an implementation of the disclosure.

FIG. 1 shows a simplified representation of a database hierarchy 100 where multiple slave databases 108a-c are connected to a master database 104. Master database 104 and slave databases 108a-c may be implemented on servers that include processor circuitry and memory circuitry, which when configured control the operation of the servers. Master database 104 provides database updates in order to replicate its database onto multiple slave databases 108a-c though network 112. Database replication allows multiple copies of the master database 104 to be maintained over multiple slave databases 108a-c. By replicating the master database 104 onto multiple slave databases 108a-c, the data inside the master database 104 can be made available across many different slave database 108a-c improving reliability and performance since the data and data requests can be shared across multiple database servers.

In the example shown in FIG. 1, each slave database 108a-c receives database updates directly from master database 104 through network 112. The time it takes to replicate the master database 104 is based on the available network bandwidth of master database 104 because all updates are sent directly from master database 104.

Master database 104 may receive all of the database inserts and updates and process database requests, while slave database 108 may only process database read requests, such as SELECT queries from the database. Slave databases 108 receive database updates from master database 104, which keep the data in the slave databases synchronized with the data in the master database.

Although, FIG. 1 shows master database 104 communicating database updates directly to slave databases 108*a-c*, slave databases 108*a-c* may also relay database updates from the master database 104 to other slave databases. For example, slave database 108*a* may receive database updates from master database 104, and may relay those database updates to slave database 108*b*. The communication path which database updates are communicated between the master database 104 and all of the slave databases, such as slave databases 108*a-c*, determines the database hierarchy.

Figure 2:
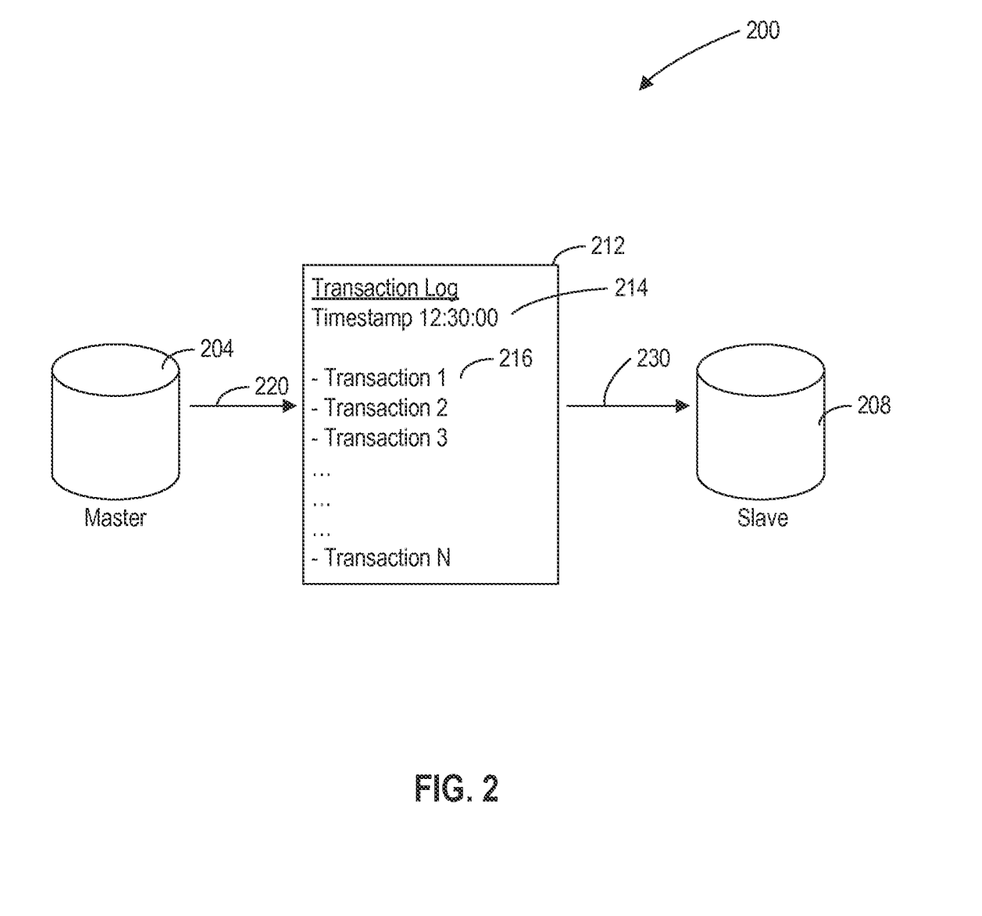
FIG. 2 is a representation of a master database providing a database update to a slave database in accordance with an implementation of the disclosure.

FIG. 2 shows a representation of a master database 204 providing a database update 212 to a slave database 208. Master database 204 provides database updates 212 in order to keep the data within the slave databases 208 in sync with the master database 204. One way that the master database 204 updates the slave databases is by using database update messages 212. Database update messages 212 include information which the slave databases 208 process in order to synchronize the slave databases' data with the master database 204. In some cases, database update messages 212 may be relayed by a slave database to another slave database.

The database update message 212 includes information which may be used to update databases. This information includes timestamps 214 and transaction logs 216. Timestamps 214 may be used to determine when the master database 204 sent the database update or when the database update was originally created. In some instances, the database update message 212 may be relayed by multiple database servers. In these instances, the timestamp 214 may indicate when the master database 204 originally produced the database update message 212 which was relayed by other database servers. Transaction logs 216 include information which databases use to update their database data. This information may include database transactions, which databases can apply directly to their database. These database transactions include database insert, delete, and update commands which change the data within the database. Transaction logs may include one or more database transactions.

The timestamp 214 may be used to determine the order to apply database updates in the case where multiple database updates have been received. The timestamp 214 also allows the receiving database to determine how old the database update is. For example, a freshness metric, which indicates how old a database update is, may be determined by comparing the timestamp with the receiving database server's current time. The difference between the two times indicates how old the database update message is. The freshness of a database update message may also be used to determine whether database updates are being received by the database in a timely manner.

Figure 3A:
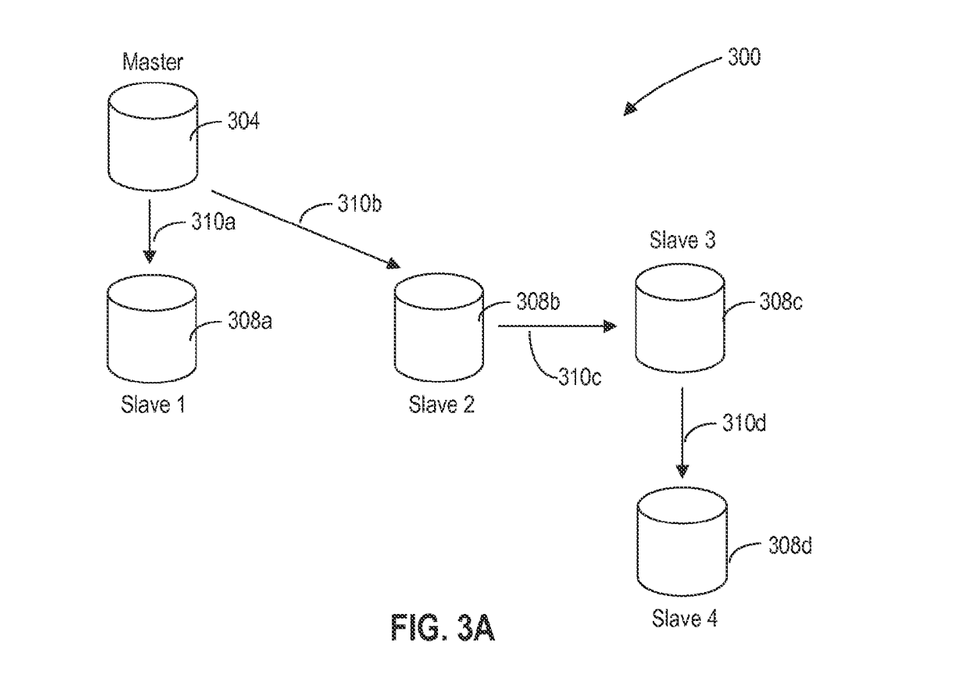
FIGS. 3A-B are representations of a database hierarchy where a slave database is reconfigured to receive database updates from a different database server in accordance with an implementation of the disclosure.
Figure 3B:
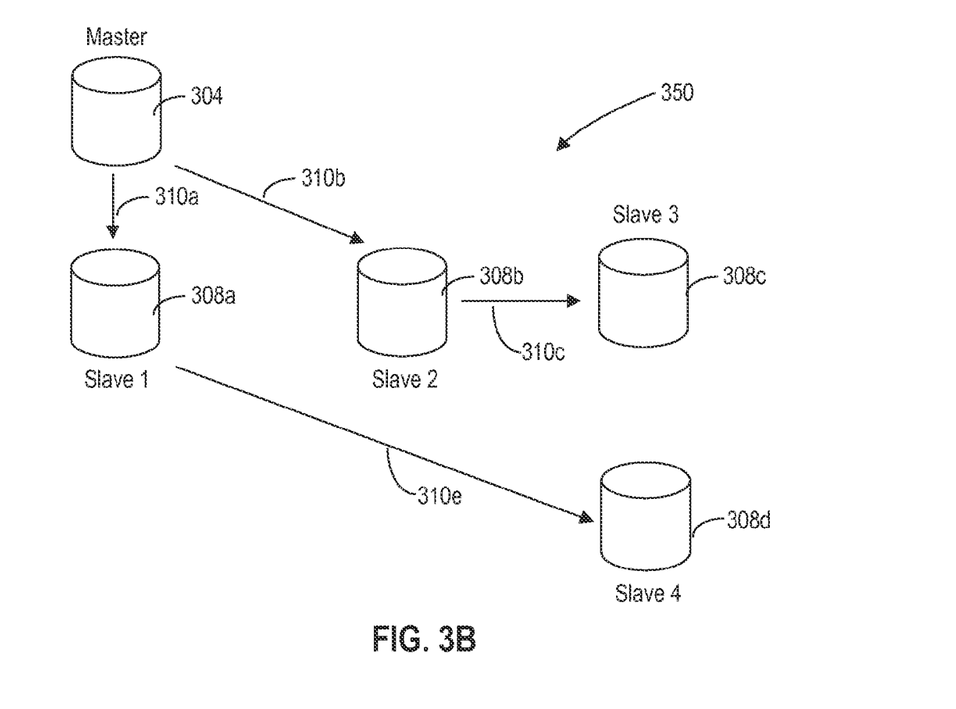

FIGS. 3A-B shows representations of a database hierarchy 300 and 350 where a slave database 308*d* is reconfigured to receive database updates from a different database server. Replication of the master database to the slave databases is performed by providing database update messages from the master database to the slave databases. These database update messages may be communicated directly from the master database to the slave database or relayed from a slave database to another slave database. These communication paths define a database hierarchy.

FIG. 3A shows an example of a database hierarchy. Master database 304 communicates database update messages to slave databases 308*a* and 308*b* over communication path 310*a* and 310*b*. Slave database 308*b* relays the database update messages received from master database 304 to slave database 308*c* over communication path 310*c*. Slave database 308*c* relays the database update messages received from slave database 308*b* to slave database 308*d* over communication path 310*d*. As shown, a there is a communication path from the master database 304 to each of the slave databases 308*a-d*. This database hierarchy allows all of the slave databases 308*a-d* to maintain updated databases with the master database 304.

When determining communication paths between database servers, certain goals should be met. For example, each slave database should have a communication path, whether direct or indirect, to the master database in order to receive database update messages. If a slave database does not have a communication path, database update messages will not be received and the database will become out of sync with the master database.

Slave databases should also be updated within a reasonable amount of time from the master database. If the time that a slave database takes to receive database update messages is too long, the master database and slave databases may become out of sync, and database requests from the slave database may result in different results, providing requests for data with stale information. FIG. 3B shows an example of reconfiguration of the database hierarchy to meet these goals.

In FIG. 3A, slave database 308*d* receives database update messages from the master database 304 relayed through two slave databases, 308*b* and 308*c*. Slave database 308*d* may determine the time that a database update message takes to be received from the master database 304. Slave database 308*d* may then determine that the amount of time that the database update message takes to be received is too long and decide to reconfigure its communication path to receive database update messages from a different database. In some implementations slave database 308*d* may randomize the measurement of time it takes for the database to receive an update. For example, the slave database 308*d* may multiply the time measurement with a random value. If the randomized measurement exceeds a certain time threshold for receiving an update, the slave database 308*d* may select a new database to receive database update messages from, whether relayed from the master database 304 or received by the master database 304. As shown on FIG. 3B, slave database 308*d* ends the communication path 310*d* between slave database 308*c* and 308*d*, selects slave database 308*a* to receive database update messages from, and starts the communication path 310*e* between slave database 308*a* and 308*d*. In this example, slave database 308*d* now only needs to go through one relay from slave database 308*a* to receive database update messages from master database 304. This provides a mechanism for slave databases to reconfigure their communication paths in order to receive database update messages in a timely manner and also ensures that slave databases are directly or indirectly connected to the master database.

Time may be one metric that a slave database uses to determine whether reconfiguration of its communication path to another database is needed. Other mechanisms may be used, in conjunction or separately, by a database to determine whether to reconfigure its communication paths to another database. For example, mechanisms which determine a timing metric between a master database and the current database may be used. In some implementations, a timing metric between the current database and other databases may be used. Other network metrics, such as latency, bandwidth, cost of network transit, and/or relay hops may be used to determine whether reconfiguration should be performed. In some implementations, the freshness metric may be used to determine whether a database should reconfigure its communication paths to another database.

Even though the metrics described above are suitable for determining whether a slave should reconfigure its network path, it is often possible that the deterioration of the above mentioned metrics may be related to a temporary disturbance to one of the slaves in the network path. For example, a first slave in the network path may receive an unusual request for a large amount of data. Due to this unusual request, the other databases having the first slave in their network path to the master database may experience some deterioration in the measurement of their timing metrics. However, it is possible that the timing cost for reconfiguring the network path may be much larger than the time it takes for the first server to recover from the unusual request for data. In such a situation, the deterioration in the network metric to the extent that it goes over a transaction threshold may be a false indicator of the health network path. To prevent such a risk of false indication, the database server may randomize the measurement for its metric. By randomizing, the database server may multiply a random value to the measured metric. The randomized measured metric may be a combination of a processor generated random number and the measured metric. The combination may include multiplication and/or any suitable operation for combining the random number with the measured metric.

In some implementations, a network latency may be determined by the slave database. For example, slave database 308d may determine that the network latency between a database server and itself is too large. This may be determined by comparing randomized network latency to a predetermined network latency threshold, and if the randomized network latency exceeds the threshold, database 308d may determine a new database to communicate with. Database 308d may determine the network latency between other databases and reconfigure its communication path to the database with the lowest network latency. In some implementations, the network latency may be determined based on the combined network latency from all the relayed communication paths from the master database 304 to database 308d.

In some implementations, the number of relays may be used to determine whether a database should reconfigure its communication path. For example, in FIG. 3A, database 308d receives database update messages from master database 304 relayed through slave 308b and 308c. In FIG. 3B, database 308d reconfigures itself to communicate with 308a. The number of relay points decreases from two to one which may allow database 308d to receive database updates messages in shorter time. If a randomized number of relays between the database and the master database exceeds a threshold number of relays, the database may reconfigure its communication path.

In some implementations, the number of database transactions performed in a given time may be used to determine whether a database should reconfigure its communication path. Databases may monitor how many database transactions are performed in a given time period. This database transaction rate may indicate how fast the database is receiving update messages. If there is a delay or communication problem between the master database and the current database, the database transaction rate may be low. The database may compare a randomized database transaction rate with a predetermine transaction rate threshold. If the randomized transaction rate is less than the transaction rate threshold, the data may reconfigure its communication path to receive database updates from another database.

In some implementations, a database cost metric may be determined for each database server in the network. Selecting a database from which to receive database update messages may be based on the cost metric. The cost metric may be determined between the current database and each database server in the network. The cost metric may be based on a network metric, such as network latency, number of relay hops, network bandwidth, network topology, and/or any suitable parameter.

For example, after the database determines that a new database should be selected to receive database update messages from, timing metrics for each server in the network may be determined. The timing metric may be based on at least one network metric between the current database and each database in the network. For example, the network latency between the current database and each of the databases in the network may be determined as the timing metric and the database with the lowest timing metric may be selected.

In some implementations, each database in the network may be assigned a weight value. The weight value may be based on one of the network metrics. The weight value may weigh the timing metric of the database making one database a better choice to be selected than another. Some other examples of weight metric may include, but are not limited to, cable distance from receiving database, reliability of a database, bandwidth of a database, link utilization of database, and/or other suitable weight metrics.

In some implementations, a database may be assigned a weight value based a length of networking cable from the receiving database. For example a first database may be in on the same physical rack as the receiving database and a second database may be on a different rack farther away from the receiving database. The first database may have a lower weight, in this case, and may be a more favorable selection for receiving an update from. For example, in a situation where the measured latency between the first database and the second database is the same, the first database would make a more favorable selection, due to its proximity to the receiving database, than the second database. The database selection, in this illustration, may be based on networking cable distance as a weight and at least one database cost metric.

In some implementations, a database may be assigned a weight value based on reliability of the database. For example, if a first database has a frequency of failures lower than a frequency of failures of a second database, then the first database may have a lower weight than the second database. The lower weight would reduce the database cost of the first database to a larger extent than the weight of the second database. For example, if latency between the receiving database and the first database is the same as latency between the receiving database and the second database, then the lower frequency of failures of the first database may make it a more favorable choice for receiving an update from. The database selection, in this illustration, may be based on reliability as a weight and at least one database cost metric.

In some implementations, a database may be assigned a weight value based on link utilization of the database. Link utilization may correspond to a percentage of network bandwidth used by the database over a period of time. A first database with a lower link utilization than a link utilization of a second database may hold a lower weight. The first database, in this case, is more likely to be capable of processing more requests than the second database. Therefore the first database may make a more favorable selection for receiving an update from. For example, if latency between the receiving database and the first database is the same as latency between the receiving database and the second database, then the lower link utilization of the first database may make it a more favorable selection for receiving an update from. The database selection, in this illustration, may be based on link utilization as a weight and at least one database cost metric.

Accordingly, a database cost metric may be weighed by factoring in the weight of each database and/or other network based metrics. The weight may be based on individual weight values discussed previously and/or a combination of weight values discussed previously. Consequently, a database with the lowest weighed database cost metric may be selected.

In some implementations, database 308d may randomly reconfigure its communication path with another database rather than determine a preferred database to communicate with. Once database 308d determines that it should reconfigure its communication path, database 308d may create a communication path with any other database than the one it is currently communicating with. By randomly allowing database 308d to determine a new communication path, determining a new database to connect to is simplified. Delay introduced by determining a new communication path is reduced allowing for less time that database 308d is not receiving database update messages from master database 304, allowing for database 308d to sync faster.

Figure 4:
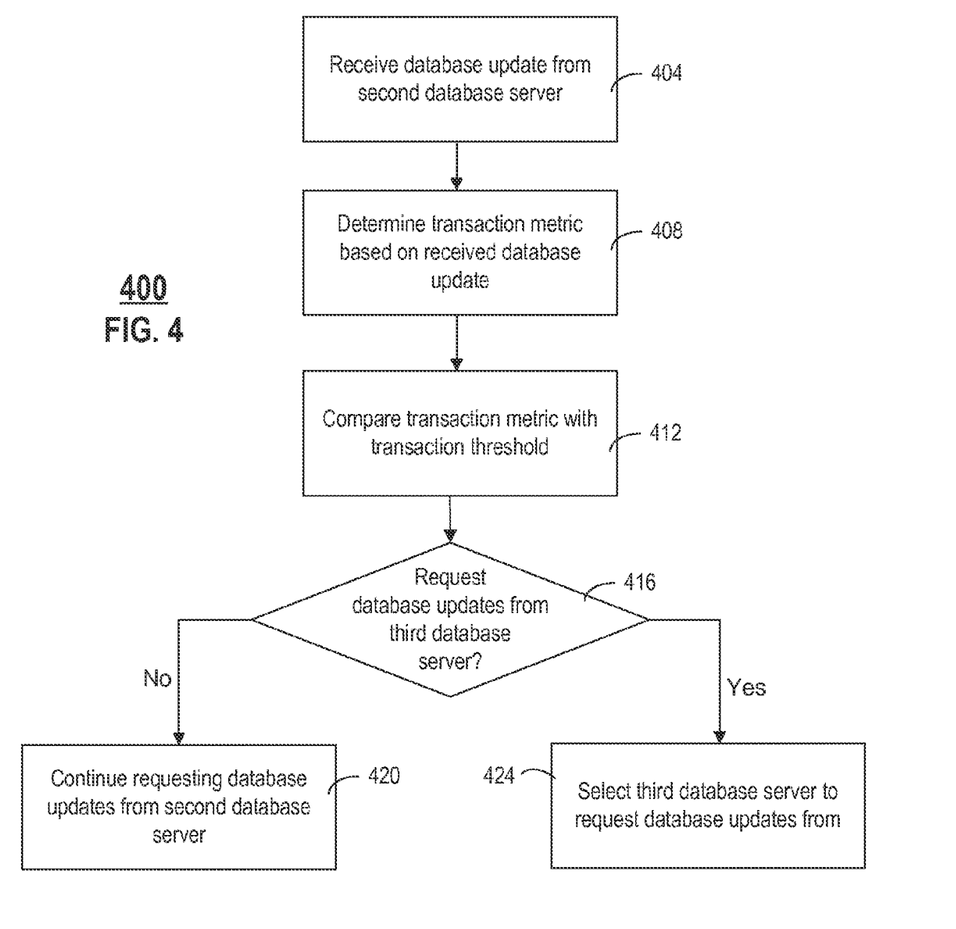
FIG. 4 is a flowchart representation of a database server receiving database updates in accordance with an implementation of the disclosure.

FIG. 4 shows a flowchart representation 400 of a database server receiving database updates. At 404, a database server receives a database update message from another database server. The database update message may be like database update message 212. The database update message may include information which may be used to update the database, such as timestamps and transaction logs. The transaction log may include at least one database transaction which may be a database command which modifies the database.

In some implementations, the timestamp indicates the time which a master database server produced the database transactions which are in the database update message. In some implementations, the database may use the transaction log, and the database transactions contained within it, and apply them to the current database. By applying the database transactions to the current database, the current database may be synchronized with the master database server up to the time which is indicated in the timestamp.

At 408, a transaction metric may be determined based on the received database update message. The transaction metric may be based on a freshness metric; a network metric, such as network latency, number of relays, network bandwidth; and a database transaction rate. The transaction metric may be randomized by combining the value of the transaction metric with a randomly determined value. At 412, the randomized transaction metric may be compared with a predetermined transaction threshold. At 416, if based on the comparison of the transaction metric and the transaction threshold the database determines that it should request database updates from another database server, at 424, a different database will be selected to request database updates from. Otherwise, at 420, the database will continue to request database updates from the database which it is currently communicating with.

Figure 5:
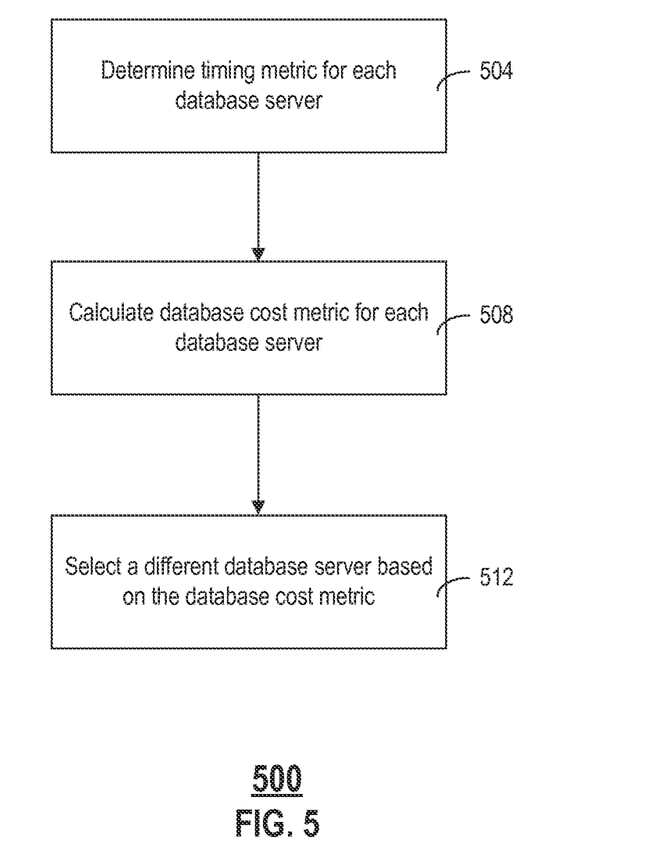
FIG. 5 is a flowchart representation of a database server selecting a different database server database to receive database updates from in accordance with an implementation of the disclosure.

FIG. 5 shows a flowchart representation 500 of a database server selecting a different database server database from which to receive database updates. After a database server determines that it should request database updates from another database server, the database server may determine which database server to select as the database to communicate with. At 504, a timing metric may be determined for each database server in the network. At 508, a cost metric may then be calculated for each of the database servers. At 512, a different database server may be selected based on the determined cost metric.

In some implementations, the same database server may actually be selected based on the determined cost metric. In some implementations, cost metrics for a partial number of database servers in the network may be calculated. This would minimize the number of cost metrics that would need to be calculated. The partial number of database servers which cost metrics are calculated for may be determined based on network metrics of the database servers.

Figure 6:
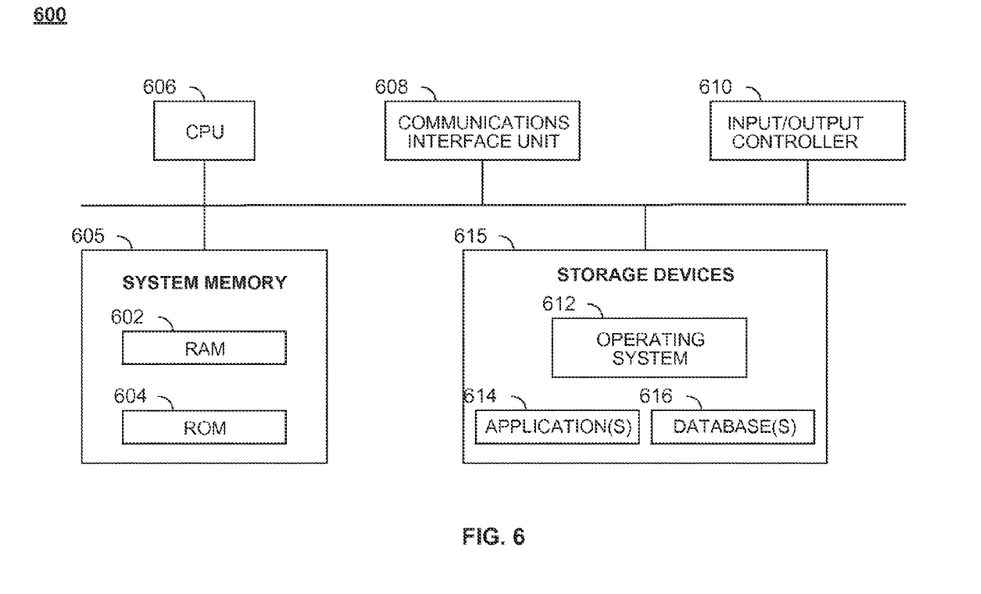
FIG. 6 shows a block diagram of a computing device in accordance with an implementation of the disclosure.

FIG. 6 is a block diagram of a computing device, such as any of the components of the system of FIGS. 1-3, for performing any of the processes described herein. Each of the components of these systems may be implemented on one or more computing devices 600. In some aspects, a plurality of the components of these systems may be included within one computing device 600. In some implementations, a component and a storage device may be implemented across several computing devices 600.

The computing device 600 comprises at least one communications interface unit 608, an input/output controller 610, system memory 605, and one or more data storage devices 615. The system memory includes at least one random access memory (RAM 602) and at least one read-only memory (ROM 604). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 can be linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device. The data storage device may comprise an appropriate combination of magnetic, optical or semiconductor memory, and may include, for example, RAM 602, ROM 604, and s flash drive, an optical disc such as a compact disc or a hard disk or drive. The CPU 606 and the data storage device each may be, for example, located entirely within a single computer or other computing device; or connected to each other by a communication medium, such as a USB port, a serial port cable, a coaxial cable, an Ethernet cable, a telephone line, a radio frequency transceiver or other similar wireless or wired medium or combination of the foregoing.

For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (for example, computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an un-compiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to editing a subsection of an electronic document via a notification message as described herein. The program also may include program elements such as an operating system 612, a database management system and "device drivers" that allow the processor to interface with computer peripheral devices (for example, a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, a cable line, or even a telephone line using a modem. A communications device local to a computing device 600 (for example, a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Further, although databases are shown communicating with only one other database, databases may communicate with multiple databases. One database may relay database update messages to multiple databases. Databases may also receive database update messages from multiple databases. Databases may use the timestamp or other database transaction identifier to determine whether a database update message has been applied already or whether a duplicate database update message has been received. Further, certain portions of the disclosure may be implemented as "logic" or a "component" that performs one or more functions. This logic may include hardware, such as an application specific integrated circuit or a field programmable gate array, software, or a combination of hardware and software.

What is claimed is:

1. A method for receiving database updates, the method comprising:
   receiving, at a first server, a database update requested from a second server;
   determining, at the first server, a transaction metric value based on the received database update, wherein the transaction metric value is for a metric utilized to determine whether a network path should be reconfigured;
   determining, at the first server, a random number;
   determining, at the first server, a randomized transaction metric value based on multiplying the transaction metric value by the random number wherein the randomized transaction metric value is an adjustment of the transaction metric value by the random number to reduce the likelihood of a false indication of a deterioration of network health;

comparing, at the first server, the randomized transaction metric value with a predetermined transaction metric threshold value;

determining, at the first server, that the randomized transaction metric value is worse than-the predetermined metric threshold value; and in response to determining that the randomized transaction metric value is worse than the predetermined transaction threshold value, selecting, at the first server, a third server to request database updates.

2. The method of claim 1, wherein the selecting the third server to request database updates is random.

3. The method of claim 1, wherein the database update comprises a timestamp and a database transaction log, wherein the database transaction log comprises at least one database transaction.

4. The method of claim 3, wherein the timestamp indicates a time when a master server produced the at least one database transaction, and wherein the master server comprises a master database for providing the database updates.

5. The method of claim 4, wherein the transaction metric value is based on a number of database transactions received at the first server in a predetermined time.

6. The method of claim 4, wherein the transaction metric value is based on the timestamp and a server time of the first server.

7. The method of claim 1, further comprising determining a timing metric for each server in a list of database servers.

8. A database system comprising a plurality of database servers which communicate through a network each of the servers including a processor, wherein a first server of the plurality of database servers is configured to:

receive a database update requested from a second server;

determine a transaction metric value based on the received database update, wherein the transaction metric value is for a metric utilized to determine whether a network path should be reconfigured;

determine a random number determine a randomized transaction metric value based on multiplying the transaction metric value by the random number wherein the randomized transaction metric value is adjustment of the transaction metric value by the random number to reduce the likelihood of a false indication of a deterioration of network health;

compare the randomized transaction metric value with a predetermined transaction metric threshold value;

determine that the randomized transaction metric value is worse than the predetermined metric threshold value; and in response to determining that the randomized transaction metric value is worse than the predetermined metric threshold value, select a third server to request database updates.

9. The database system of claim 8, wherein the selection of the third server is random.

10. The database system of claim 8, wherein the database update comprises a timestamp and a database transaction log, wherein the database transaction log comprises at least one database transaction.

11. The database system of claim 10, wherein the timestamp indicates a time when a master server produced the at least one database transaction, wherein the master server comprises a master database for providing the database updates.

12. The database system of claim 11, wherein the transaction metric value is based on a number of database transactions received at the first server in a predetermined time.

13. The database system of claim 11, wherein the transaction metric value is based on the timestamp and a server time of the first server.

14. The database system of claim 8, wherein a timing metric is determined for each server in a list of database servers.

15. A non-transitory computer readable medium storing computer executable instructions, which, when executed by a processor circuitry, causes the circuitry to carry out a method for receiving database updates, the method comprising:

receiving, at a first server, a database update requested from a second server;

determining, at the first server, a transaction metric value based on the received database update, wherein the transaction metric value is for a metric utilized to determine determining whether a network path should be reconfigured;

determining, at the first server, a random number;

determining, at the first server, a randomized transaction metric value based on multiplying the transaction metric value by the random number wherein the randomized transaction metric value is an adjustment of the transaction metric value by the random number to reduce the likelihood of a false indication of a deterioration of network health;

comparing, at the first server, the randomized transaction metric value with a predetermined transaction metric threshold value;

determining, at the first server, that the randomized transaction metric value is worse than the predetermined metric threshold value; and in response to determining that the randomized transaction metric value is worse than the predetermined transaction threshold value, selecting, at the first server, a third server to request database updates.

16. The non-transitory computer readable medium of claim 15, wherein the selecting the third server to request database updates is random.

17. The non-transitory computer readable medium of claim 15, wherein the database update comprises a timestamp and a database transaction log, wherein the database transaction log comprises at least one database transaction.

18. The non-transitory computer readable medium of claim 15, wherein the timestamp indicates a time when a master server produced the at least one database transaction, and wherein the master server comprises a master database for providing the database updates.

19. The non-transitory computer readable medium of claim 15, wherein the transaction metric value is based on a number of database transactions received at the first server in a predetermined time.

20. The non-transitory computer readable medium of claim 15, wherein the transaction metric is based on the timestamp and a server time of the first server.

* * * * *